(12) United States Patent
Motallebi et al.

(10) Patent No.: US 10,147,947 B2
(45) Date of Patent: Dec. 4, 2018

(54) PURIFICATION AND USE OF FERROCYANIDE SOLUTIONS

(71) Applicant: Natron Energy, Inc., Santa Clara, CA (US)

(72) Inventors: Shahrokh Motallebi, Los Gatos, CA (US); Colin Deane Wessells, Palo Alto, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 15/840,463

(22) Filed: Dec. 13, 2017

(65) Prior Publication Data
US 2018/0269481 A1    Sep. 20, 2018

Related U.S. Application Data

(60) Provisional application No. 62/474,044, filed on Mar. 20, 2017.

(51) Int. Cl.
| | | |
|---|---|---|
| *H01M 4/58* | (2010.01) | |
| *C01C 3/12* | (2006.01) | |
| *H01M 10/054* | (2010.01) | |
| *H01M 4/02* | (2006.01) | |

(52) U.S. Cl.
CPC ............. *H01M 4/5825* (2013.01); *C01C 3/12* (2013.01); *H01M 10/054* (2013.01); *C01P 2002/30* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 4,046,861 | A * | 9/1977 | Reinhardt | ................. C09C 1/26 |
| | | | | 423/367 |
| 5,935,380 | A * | 8/1999 | White | ..................... B01J 20/04 |
| | | | | 159/48.1 |
| 2012/0077037 | A1* | 3/2012 | Kawamoto | ............ B82Y 30/00 |
| | | | | 428/402.24 |

OTHER PUBLICATIONS

Keggin et al. Nature, 1936, 577-578.*
You et al, Environmental and Energy Science, 2014.
Hornok et al, Journal of Colloid and Interface Science, 2007.
Wessells et al, ACS Nano, 2012.

* cited by examiner

*Primary Examiner* — Clinton A Brooks
(74) *Attorney, Agent, or Firm* — Patent Law Offices of Michael E. Woods; Michael E. Woods

(57) ABSTRACT

A system and method for efficiently purifying a starting material for a TMCC final product as well as a system and method for efficiently producing high quality TMCC material using the purified starting material.

15 Claims, 2 Drawing Sheets

PURIFICATION AND USE OF FERROCYANIDE SOLUTIONS

CROSS REFERENCE TO RELATED APPLICATIONS

This application claims benefit of U.S. Patent Application No. 62/474,044 filed 20 Mar. 2017, the contents of which are hereby expressly incorporated by reference thereto in its entirety for all purposes.

FIELD OF THE INVENTION

The present invention relates generally to production of components of a battery, and more specifically, but not exclusively, to purification and use of a starting material for transition metal coordination compound (TMCC) cathode active materials.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Transition metal coordination compounds (TMCC) cathode active materials have been demonstrated in non-production environments as having many properties beneficial to a wide range of secondary cells. There exist some challenges to producing TMCC cathode active materials at large industrial scale.

One of those challenges relates to production of high quality TMCC final products. A starting material, e.g., sodium ferrocyanide, may be used to produce these TMCC final products. A purity of that starting material may influence TMCC final product quality and influence the process used to make the TMCC products.

Some efforts at purification may not be reliable in producing high quality TMCC final products. An alternative to purification may include use of an ultra-pure and expensive grade of the starting material. These ultra-pure starting materials may be a few to many times as expensive as compared to standard purity and may address some issues with the production of the TMCC final products. Unfortunately the ultra-pure starting material is not always guaranteed to produce high-quality TMCC final products.

BRIEF SUMMARY OF THE INVENTION

Disclosed is a system and method for efficiently purifying a starting material for a TMCC final product as well as a system and method for efficiently producing high quality TMCC material using the purified starting material.

The following summary of the invention is provided to facilitate an understanding of some of the technical features related to purification of a starting material for TMCC production and to production of high quality TMCC final products using this purified starting material, and is not intended to be a full description of the present invention. A full appreciation of the various aspects of the invention can be gained by taking the entire specification, claims, drawings, and abstract as a whole. The present invention may be applicable to other starting materials for TMCC final products in addition to a sodium ferrocyanide starting material, may be applicable to production of other materials in addition to TMCC final products, and to purification of certain starting materials.

An embodiment of the present invention may include an oxidative treatment of a ferrocyanide solution used as a precursor in the preparation of transition metal coordination compounds (TMCC) cathode active materials. This oxidative purification method may result in a starting material that allows for formation of well faceted cubic crystals of TMCC materials. These materials may have an aggregate size of the crystallites greater than 10 microns and are therefore easily filterable over a filter media without any clogging of the filter.

An embodiment of the present invention may include formation of well faceted cubic primary crystal structure as well as larger secondary particles and tighter particle size distribution from use of this purified precursor material. Use of these particles of TMCC material in an electrode may sometimes result in enhanced electrochemical properties.

An embodiment of the purification method of ferrocyanide may have several advantages, including i) a practical, inexpensive and efficient method that can be scaled up at industrial scale; and ii) results in a batch to batch reproducibility of well controlled particle size production of corresponding transition metal coordination compounds (TMCC).

An embodiment of the present invention may include selection of special oxidative agents for purifying a starting material that includes undesirable reducing agents, and particularly when that purified starting material is intended to be used in a subsequent reaction where the reducing agents may degrade. For example, there may be four classifications of oxidizing agents (A', B', C', and D') used to purify an aqueous solution of starting material A in the presence of undesirable reducing agents also in the aqueous solution. These specifics of these classifications for an oxidizing agent are highly dependent upon the particular starting material and its subsequent use. For example A' represents an oxidizing agent that reduces to A, the starting material, B' represents an oxidizing agent that reduces to B, a material that disappears from the starting material, C' represents an oxidizing agent that reduces to C that remains in solution but is inert in the subsequent reaction, and D' represents an oxidizing agent that reduces to D that remains in solution and negatively affects the subsequent reaction to a lesser degree than the reducing agent.

A method for manufacturing a transition metal coordination compound (TMCC) material having well faceted cubic crystal grains and possessing a crystallite aggregate size of greater than 10 microns, including a) reacting an aqueous solution including a ferrocyanide salt and a first quantity of a reducing agent with a first quantity of an oxidizing agent to produce a purified aqueous solution having a second quantity of the reducing agent less than the first quantity; and b) reacting the purified aqueous solution with an aqueous solution including a set of salts of a transition metal to produce the TMCC material.

The oxidizing agent may include one or more materials selected from the group consisting of chromates such as sodium dichromate dehydrate, hypervalent iodine such as sodium periodate, hypochlorites such as sodium hypochlorite, osmium such as osmium tetroxide, perchlorates such as sodium perchlorate hydrate, peroxides such as hydrogen peroxide, peroxy acids and salts such as peracetic acid, and ammonium persulfate, oxone, potassium nitrosodisulfonate, potassium peroxodisulfate, potassium persulfate, sodium persulfate, sulfur trioxide, sulfur trioxide complexes, potassium ferricyanide, sodium ferricyanide, bromine, chlorine, iodine, trimethyamine-N-oxide, tetrapropylammonium perruthenate, potassium perruthenate, tetracyanoethylene, TEMPO, sodium phosphomolybdate, sodium permanganate, sodium percarbonate, sodium dichloroisocyanurate, selenium dioxide, potassium permanganate, phosphorus oxychloride, phosphomolybdic acid, oxalyl chloride, oxalyl bromide, nitrosyl tetrafluoroborate, 4-Methylmorpholine N-oxide, methyl chlorooxoacetate, ethyl chlorooxoacetate, N-hydroxytetrachlorophthalimide, 8-Ethylquinoline N-oxide, N,N-Dichloro-p-toluenesulfonamide, 2,3-Dichloro-5,6-dicyano-p-benzoquinone, chloranil, chloeamine-T hydrate, ammonium cerium (IV) nitrate, ammonium phosphomolybdate, and combinations thereof.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
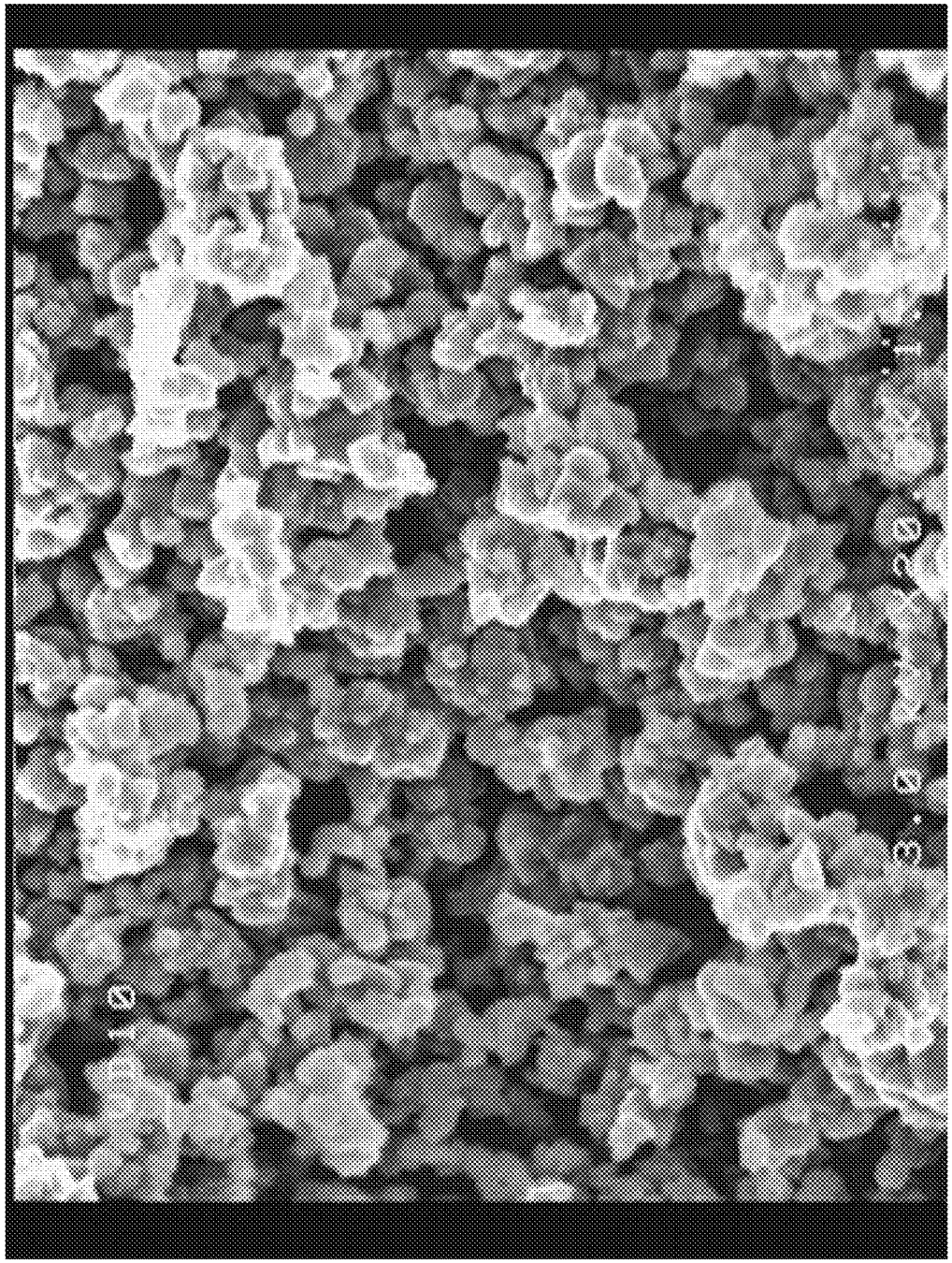
FIG. 1 illustrates a scanning electron micrograph of a control example of a transition metal coordination compound made from a standard ferrocyanide starting material.

Embodiments of the present invention provide a system and method for efficiently purifying a starting material for a TMCC final product as well as a system and method for efficiently producing high quality TMCC material using the purified starting material. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

A manufacturing process for TMCC electrode material includes use of an aqueous solution of ferrocyanide salt, for example sodium ferrocyanide, as a starting material. The presence of any type of residual reducing agent in the starting material is often detrimental to the quality of the final product. Large scale manufacture of high quality TMCC materials requires significant quantities of the starting material. Any process or system that provides significant quantities of properly purified starting materials efficiently and at low cost offers many advantages to manufacturers and consumers of these TMCC materials.

Numerous attempts to purify different grades of commercially available sodium ferrocyanide failed to produce high quality TMCC final product. For example, purification by crystallization and/or iron exchange resin treatment of sodium ferrocyanide solution produced unsatisfactory results. These unsatisfactory results may include formation of materials that are difficult to filter and formation of crystal/aggregate structures that are mal-formed and thus exhibit poorer electrochemical performance.

It is possible, at significant extra cost, to obtain an ultra-pure form of a sodium ferrocyanide solution. Use of this ultra-pure form may offer some advantages, such as an improvement to filtration. However, the crystal/aggregate structure may remain mal-formed and produce materials that exhibit poorer electrochemical performance. Therefore the extra cost of the ultra-pure starting material has not provided enough of an advantage to justify the expense.

It is speculated that certain starting material solutions may have an enhanced/extended shelf life when they include a reducing agent in solution. While some purification schema may more commonly address other types of impurities, when they do not address removal of reducing agents and when those reducing agents may interfere with the intended use of the purified starting material, the purification has not had the intended result.

In one example of an embodiment of the present invention, an oxidative treatment of a sodium ferrocyanide solution includes an addition of a small quantity of about 10 to about 10000 ppm of an oxidant. This step may result in neutralization of reducing agents which might be present in sodium ferrocyanide in the form of impurities or additives.

More broadly, the present invention relates to a simple and cost effective method of purification of a ferrocyanide by simple addition of small quantity of an oxidant into sodium ferrocyanide solution. In addition, the use of the purified starting material produces high quality TMCC electrode materials. The process and system are thus efficient and cost effective producing superior results.

A further contributor to the efficiency and cost effectiveness is that the purified solution can be used without further treatment in a subsequent manufacturing step to produce high quality TMCC materials.

Transition metal coordination compounds (TMCC) of the general formula $(Na_2X^{II}Fe^{III}[Fe^{II}(CN)_6].nH_2O)$, an open-framework crystal structure material, is a promising cathode material for rechargeable sodium-ion batteries.

This cathode material is generally prepared by addition of a mixed solution of iron(iii) and another metal ion to an aqueous ferrocyanide solution.

The reaction could also be performed by co-precipitation method where the particle morphology is adjusted by addition time, stirring speed, concentration and temperature.

Due to insolubility of these pigments, a fast precipitation of the particles in the reaction media results in the formation of very small nanoparticles of a granular not well defined crystal structures. These nanoparticles are very difficult to filter and thus their isolation represents major challenges at industrial scale. In addition, these granular shape nanoparticles exhibit an inferior electrochemical performance than that of well faceted cubic crystalline particles.

The present invention relates to purification of an aqueous solution of a ferrocyanide salt which is one of the starting materials used in the preparation of TMCC cathode materials. The oxidative purification of the ferrocyanide salt solution and its use in a direct subsequent TMCC manufacturing step resulted in the production of high quality TMCC materials. The thus obtained materials were easily filtered and their electrochemical properties were significantly improved.

EXPERIMENTAL SECTION

Example 1—Control

In a 2 liter jacketed reactor, 114 g of water is added and heated to 80 C with stirring. Solution A and B are simultaneously added over 2.0 h period under a flow of nitrogen.

The mixture is heated for another hour at 75 C then cooled to 20 C and filtered (filter paper size 11 micron). The cake is washed with 300 g of water and dried under vacuum at 80 C to give 100 g of dark blue powder.

The filtration was very slow and the overall filtration time and washing was about 4.0 h.

Sol. A: The solution was prepared by dissolving 47.0 g of manganese sulfate monohydrate and 20.0 g of iron (III) sulfate hydrate in 137 g of water.

Sol. B: The solution was prepared by dissolving 130 g sodium ferrocyanide decahydrate in 405 g of water.

FIG. 1 illustrates a scanning electron micrograph of a control example of a transition metal coordination compound made from a standard ferrocyanide starting material. The morphology and size of these particles were confirmed in the scanning electron micrograph. The scanning electron micrograph show granular particles with an average size of <100 nm.

Example 2—Oxidative Purification

Oxidative treatment of a sodium ferrocyanide solution:

In a 2 liter jacketed reactor, 114 g of water is added and heated to 80 C with stirring. Solution A and B are simultaneously added over 2.0 h period under a flow of nitrogen.

The mixture is heated for another hour at 75 C then cooled to 20 C and filtered (filter paper size 11 micron). The cake is washed with 300 g of water and dried under vacuum at 80 C to give 100 g of dark blue powder.

The filtration was very fast and the overall filtration time and washing was about 5.0 min.

Sol. A: The solution was prepared by dissolving 47.0 g of manganese sulfate monohydrate and 20.0 g of iron (III) sulfate hydrate in 137 g of water.

Sol. B: The solution was prepared by dissolving 130 g sodium ferrocyanide decahydrate and 100 mg of potassium ferricyanide in 405 g of water.

Figure 2:
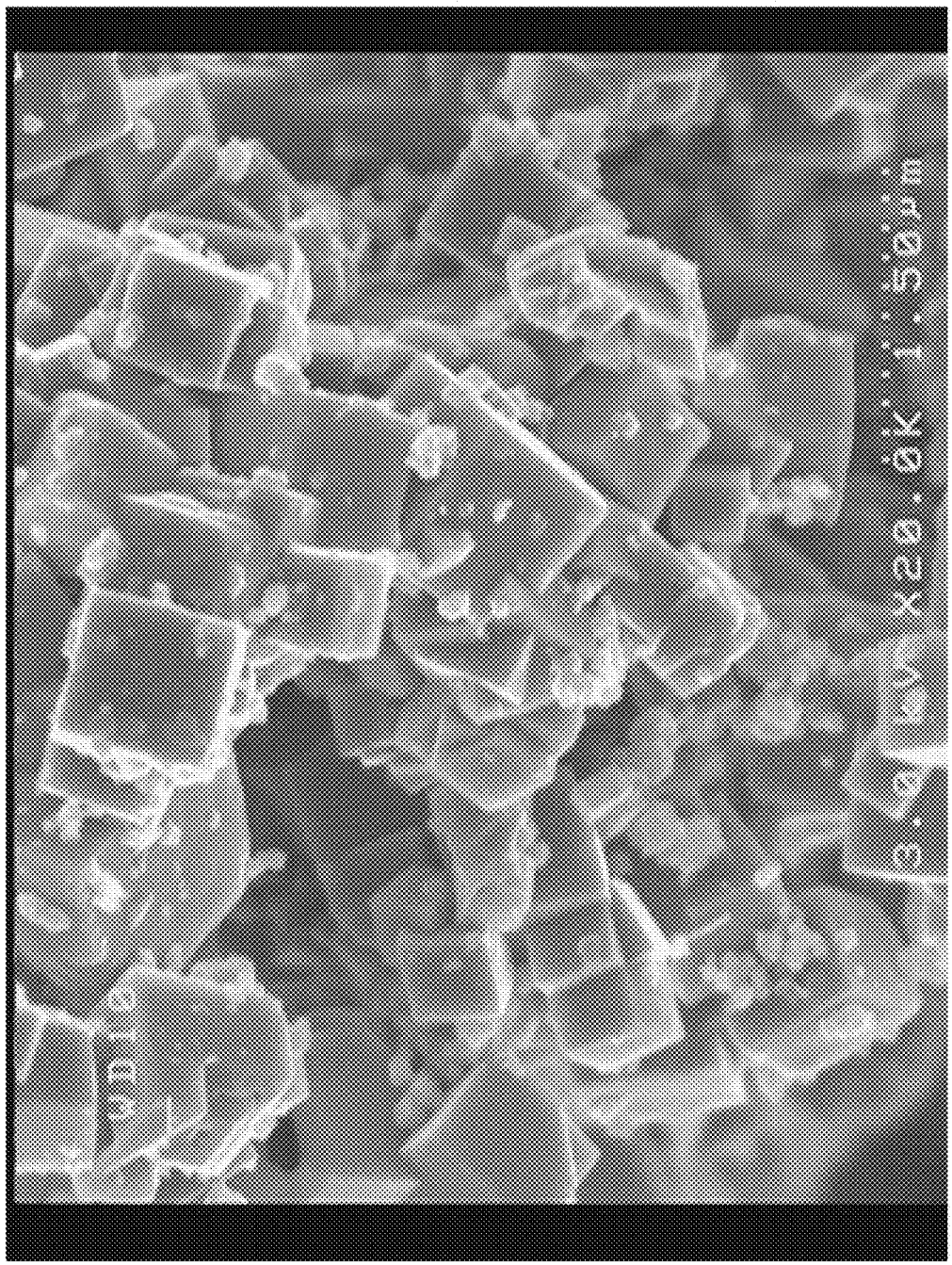
FIG. 2 illustrates a scanning electron micrograph of an improved example of a transition metal coordination compound made from an oxidatively-purified ferrocyanide starting material.

FIG. 2 illustrates a scanning electron micrograph of an improved example of a transition metal coordination compound made from an oxidatively-purified ferrocyanide starting material. The morphology and size of these particles were confirmed the micrograph of FIG. 2. This micrograph shows well defined faceted cubic crystals with an average size of >500 nm.

There are many possible oxidizing agents, including chromates such as sodium dichromate dehydrate, hypervalent iodine such as sodium periodate, hypochlorites such as sodium hypochlorite, osmium such as osmium tetroxide, perchlorates such as sodium perchlorate hydrate, peroxides such as hydrogen peroxide, peroxy acids and salts such as peracetic acid, and ammonium persulfate, oxone, potassium nitrosodisulfonate, potassium peroxodisulfate, potassium persulfate, sodium persulfate, sulfur trioxide, sulfur trioxide complexes, potassium ferricyanide, sodium ferricyanide, bromine, chlorine, iodine, trimethyamine-N-oxide, tetrapropylammonium perruthenate, potassium perruthenate, tetracyanoethylene, TEMPO, sodium phosphomolybdate, sodium permanganate, sodium percarbonate, sodium dichloroisocyanurate, selenium dioxide, potassium permanganate, phosphorus oxychloride, phosphomolybdic acid, oxalyl chloride, oxalyl bromide, nitrosyl tetrafluoroborate, 4-Methylmorpholine N-oxide, methyl chlorooxoacetate, ethyl chlorooxoacetate, N-hydroxytetrachlorophthalimide, 8-Ethylquinoline N-oxide, N,N-Dichloro-p-toluenesulfonamide, 2,3-Dichloro-5,6-dicyano-p-benzoquinone, chloranil, chloeamine-T hydrate, ammonium cerium (IV) nitrate, ammonium phosphomolybdate.

Summary

Embodiments of the present invention may highlight two aspects of the disclosed process: i) oxidative purification of a standard starting material including an aqueous solution of a ferrocyanide salt and various impurities and additives including reducing agents; and b) use of the oxidatively-purified standard starting solution to manufacture high quality TMCC electrode materials in an efficient and cost-effective manner that allows for large scale manufacturing.

In the first aspect, an embodiment of the present invention may include selection of special oxidative agents for purifying a starting material that includes undesirable reducing agents, and particularly when that purified starting material is intended to be used in a subsequent reaction where the reducing agents may degrade. For example, there may be four classifications of oxidizing agents (A', B', C', and D') used to purify an aqueous solution of starting material A in the presence of undesirable reducing agents also present in the aqueous solution.

In the first case, a starting material A in solution with one or more reducing agents may be purified by addition of an oxidizing agent A' that is a more highly oxidized form of A, when reduced, produces more of the starting material A. For example, a starting material of ferrocyanide (A) in solution with reducing agents may be purified with ferricyanide (A').

In the second case for purifying the starting material A, an oxidizing agent B' is added that when reduced, produces material B that disappears from the solution. For example, a starting material of ferrocyanide (A) in solution with reducing agents may be purified with ozone (B') that produces oxygen gas (B) that disappears from the starting material solution.

In the third case for purifying the starting material A, an oxidizing agent C' is added that when reduced, produces material C that remains in the solution but is considered inert with respect to the subsequent use of the purified starting solution with A. For example, a starting material of ferrocyanide (A) in solution with reducing agents may be purified with hydrogen peroxide (C') that produces water (C) that remains in solution with the starting material solution. A but is inert to the subsequent use, such as manufacture of high quality TMCC cathode active material.

In the fourth case for purifying the starting material A, an oxidizing agent D' is added that when reduced, produces material D that remains in the solution and degrades the subsequent reaction, but not as much as the reducing agent would. For example, a starting material of ferrocyanide (A) in solution with reducing agents may be purified with trimethylamine N-oxide (D') that produces trimethylamine (D) that remains in the starting material solution and adversely affects the subsequent reaction with the purified starting material but adverse affect is less than would be the case with the reducing agent. The classification of any oxidizing agent with respect to a starting material is dependent upon the starting material and the intended subsequent reaction. The example described herein is based upon a ferrocyanide salt disposed in an aqueous solution along with undesirable reducing agents where different types of oxidizing agents may be selected for purification before using the purified solution in the manufacture of TMCC cathode active material.

There is a fifth possible classification E' in which the reduced oxidizing agent E remains in the starting material and affects the subsequent reaction the same or more poorly than the reducing agent. Selection of E' may be dependent upon other advantages that override the negative affect on the subsequent reaction.

In the second aspect, the oxidatively-purified standard starting material may be directly used in the subsequent step, such as a TMCC manufacturing step to produce high quality TMCC materials from a standard starting material in an efficient and cost-effective manner that allows for large-scale industrial manufacture. Conventionally purified sodium ferrocyanide and standard ultra-pure sodium ferrocyanide do not allow for the same high quality materials and, in the case of the conventionally purified standard solution, have process inefficiencies preventing cost-effective large-scale industrial manufacture of the TMCC electrode materials.

In some embodiments, other characteristics or attributes of the starting material that may be altered or adjusted during a purification step may enhance or hinder production of materials from the use of the purified starting material, such as high quality TMCC materials. For example, there may be an effect of PH on the oxidative purification treatment. Some embodiments may prefer a PH range of 3-12 for oxidative purification.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for manufacturing a transition metal coordination compound (TMCC) material having well faceted cubic crystal grains and possessing a crystallite aggregate size of greater than 10 microns, comprising:
    a) reacting an aqueous solution including a ferrocyanide salt and a first quantity of a reducing agent with a first quantity of an oxidizing agent to produce a purified aqueous solution having a second quantity of said reducing agent less than said first quantity; and
    b) reacting said purified aqueous solution with an aqueous solution including a set of salts of a transition metal to produce the TMCC material.

2. The method of claim 1 wherein said first quantity of said oxidizing agent is in a range of 10 ppm to 1000 ppm.

3. The method of claim 1 wherein said purified aqueous solution includes a second quantity of said oxidizing agent less than said first quantity of said oxidizing agent.

4. The method of claim 3 wherein said purified aqueous solution includes a reduced oxidizing agent.

5. The method of claim 4 wherein said oxidizing agent includes a first class oxidizing agent wherein said reduced oxidizing agent includes said ferrocyanide salt.

6. The method of claim 5 wherein said first class oxidizing agent includes one or more materials selected from the group consisting of potassium ferricyanide, sodium ferricyanide, and combinations thereof.

7. The method of claim 4 wherein said oxidizing agent includes a second class oxidizing agent wherein said reduced oxidizing agent includes a material that dissipates from said purified aqueous solution prior to said reacting step b.

8. The method of claim 4 wherein said oxidizing agent includes a third class oxidizing agent wherein said reduced oxidizing agent includes a material that is generally inert in said reacting step b.

9. The method of claim 4 wherein said oxidizing agent includes a fourth class oxidizing agent wherein said reduced oxidizing agent includes a particular quantity of a material that degrades said reacting step b less than said particular quantity of said reducing agent degrades said reacting step b.

10. The method of claim 1 wherein said aqueous solution includes a pH in a range of 3-12.

11. The method of claim 1 wherein said purified aqueous solution includes a pH in a range of 3-12.

12. The method of claim 1 wherein both said aqueous solution and said purified aqueous solution includes a pH in a range of 3-12.

13. The method of claim 1 wherein said oxidizing agent includes one or more materials selected from the group consisting of hexacyanometallates such as sodium ferricyanide, potassium ferricyanide, and combinations thereof.

14. The method of claim 1 wherein said oxidizing agent includes one or more materials selected from the group consisting of non-metallic mineral oxidants producing one or more of hypervalent iodine compounds, perchlorates, peroxides, peroxy acids, and combinations thereof.

15. A method for manufacturing a transition metal coordination compound (TMCC) material having well faceted cubic crystal grains and possessing a crystallite aggregate size of greater than 10 microns, comprising:
  a) reacting an aqueous solution including a ferrocyanide salt and a first quantity of a reducing agent with a first quantity of an oxidizing agent to produce a purified aqueous solution having a second quantity of said reducing agent less than said first quantity; and
  b) reacting said purified aqueous solution with an aqueous solution including a set of salts of a transition metal to produce the TMCC material;
  wherein said oxidizing agent includes one or more materials selected from the group consisting of sulfur containing compounds such as sulfur trioxide.

* * * * *